Figure 1:
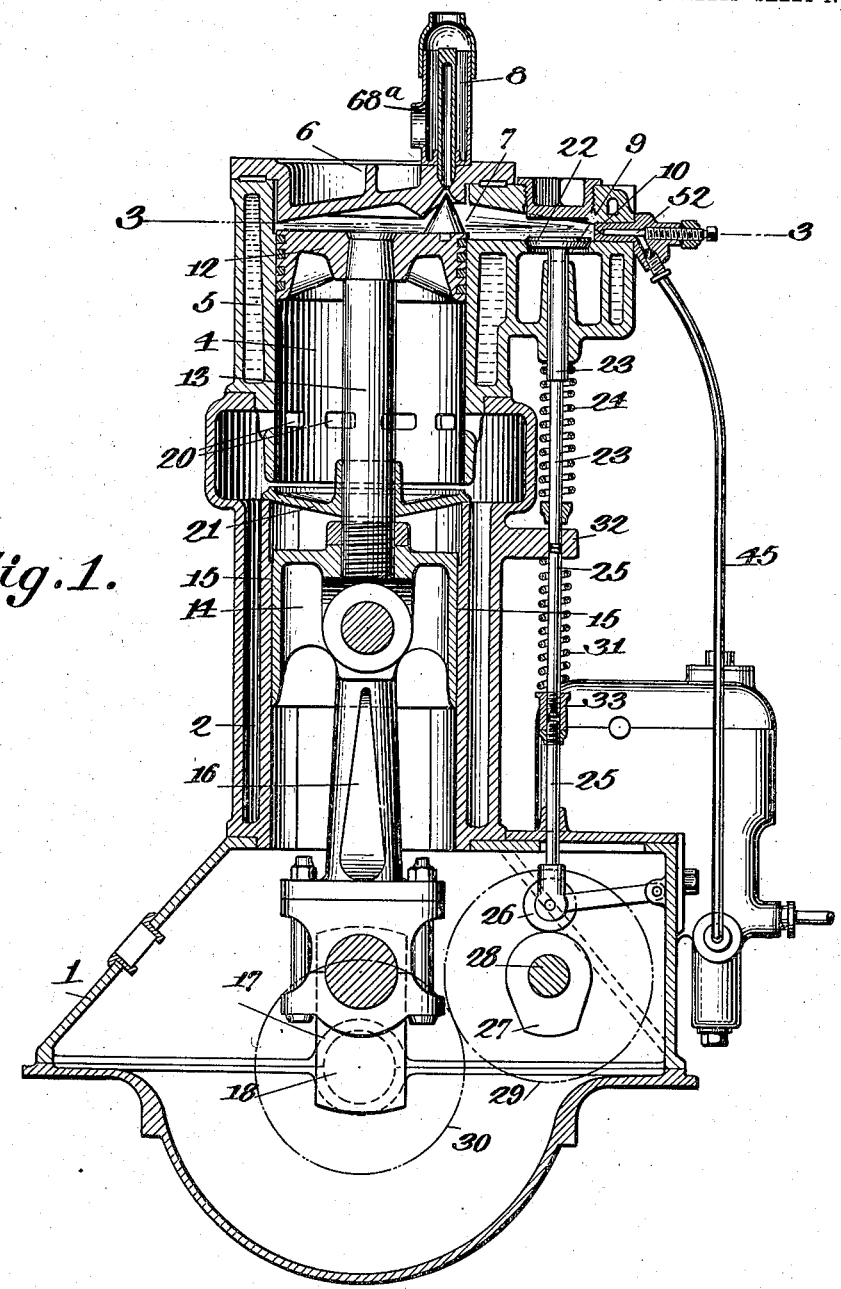

O. P. OSTERGREN.
COMBUSTION ENGINE.
APPLICATION FILED OCT. 15, 1904.

920,989.

Patented May 11, 1909.
8 SHEETS—SHEET 2.

WITNESSES:

INVENTOR
Oscar P. Ostergren
BY
ATTORNEY

O. P. OSTERGREN.
COMBUSTION ENGINE.
APPLICATION FILED OCT. 15, 1904.
920,989.
Patented May 11, 1909.
8 SHEETS—SHEET 3.
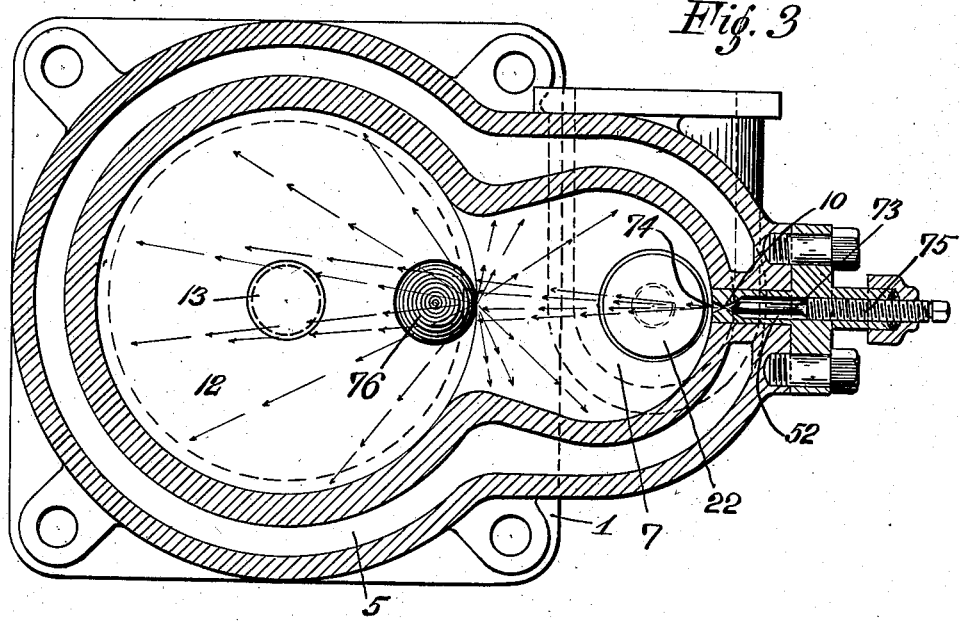
Fig. 3
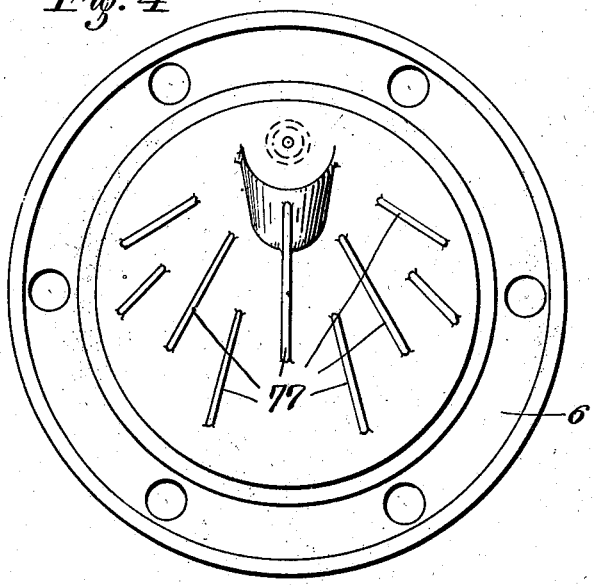
Fig. 4
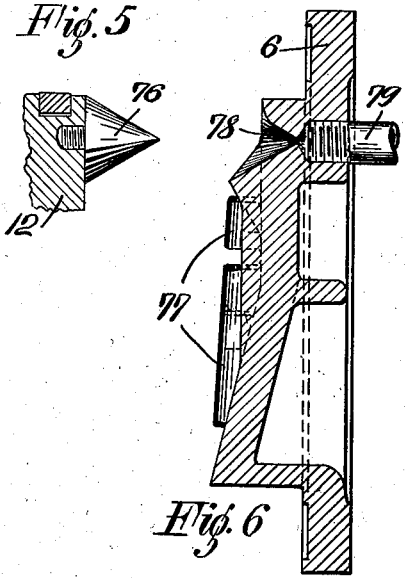
Fig. 5
Fig. 6
WITNESSES:
INVENTOR
Oscar P. Ostergren
BY
C. W. Edwards
ATTORNEY

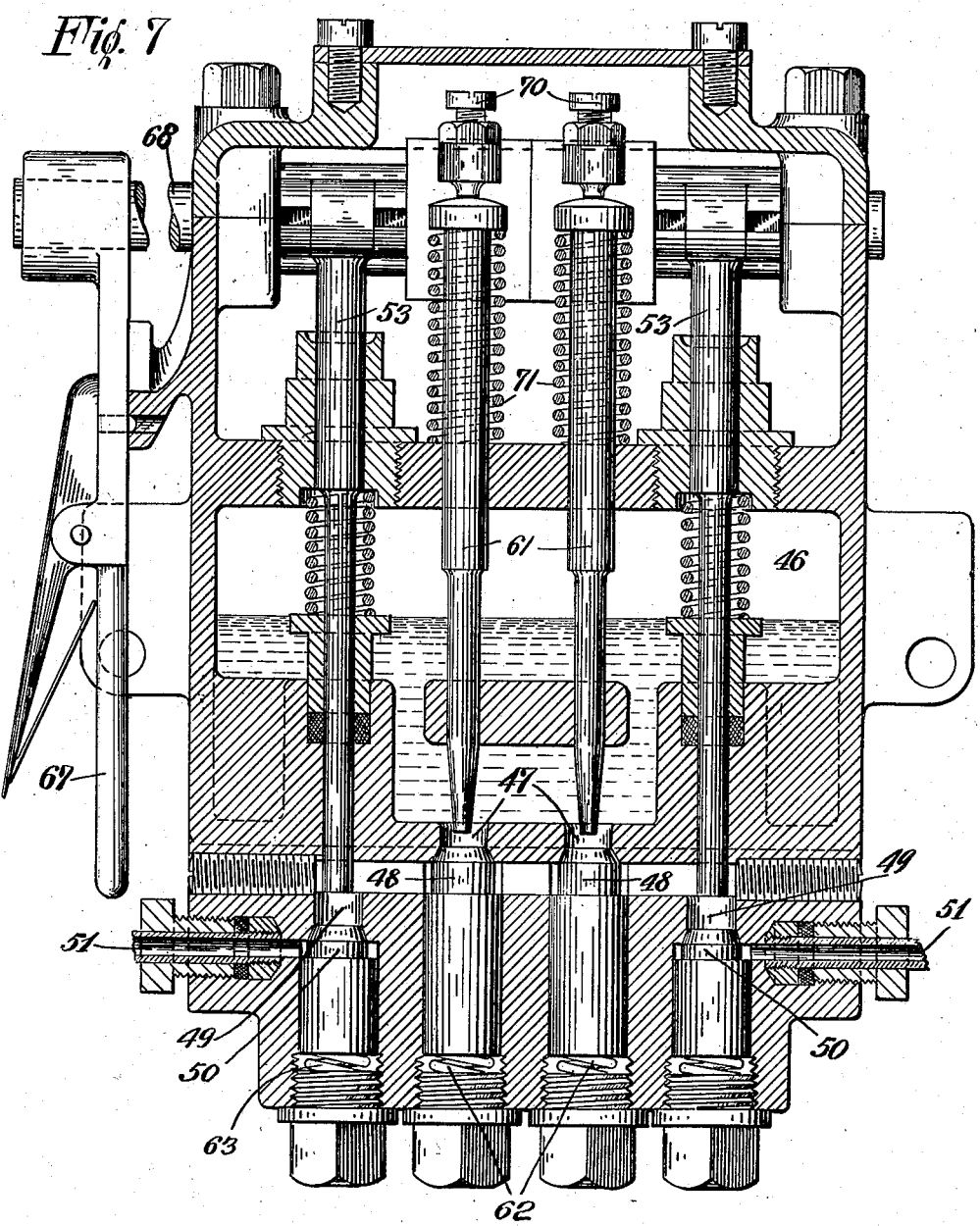

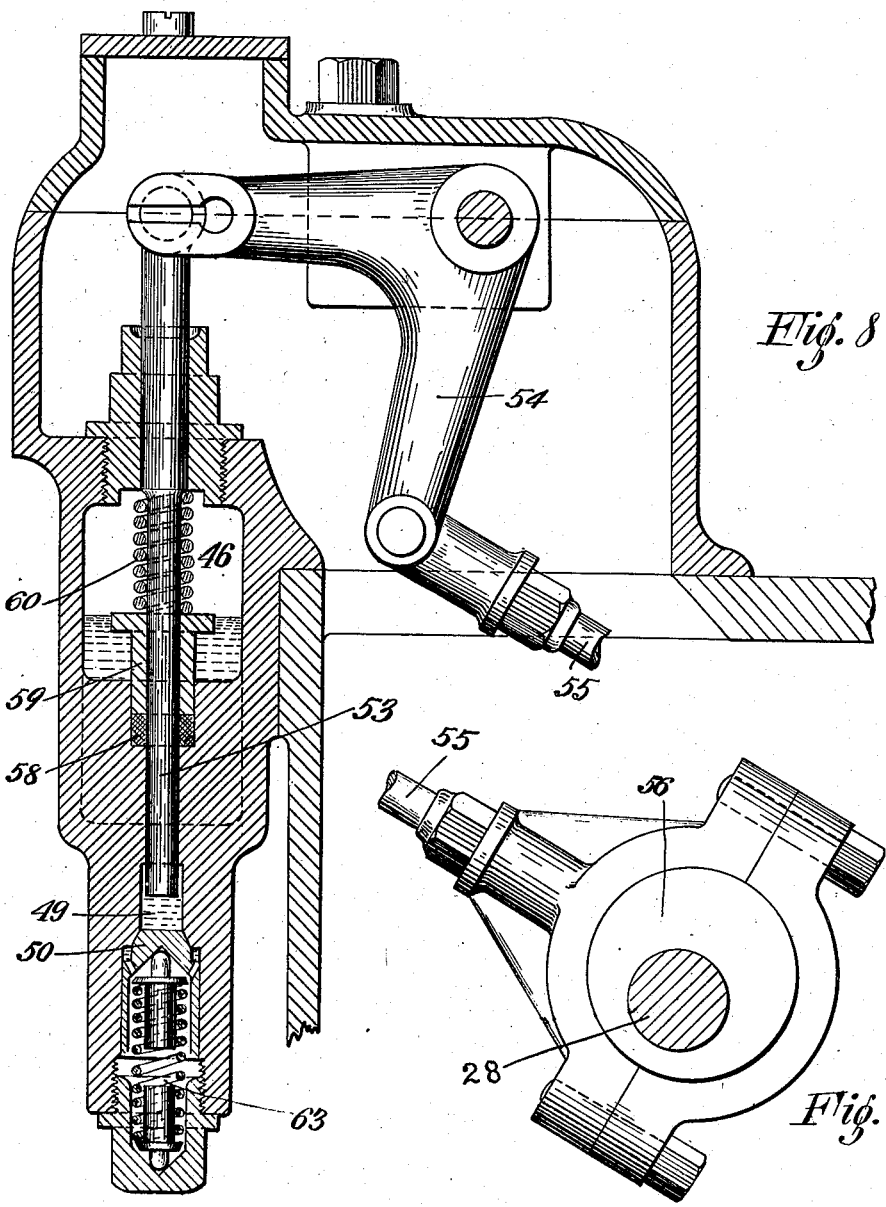

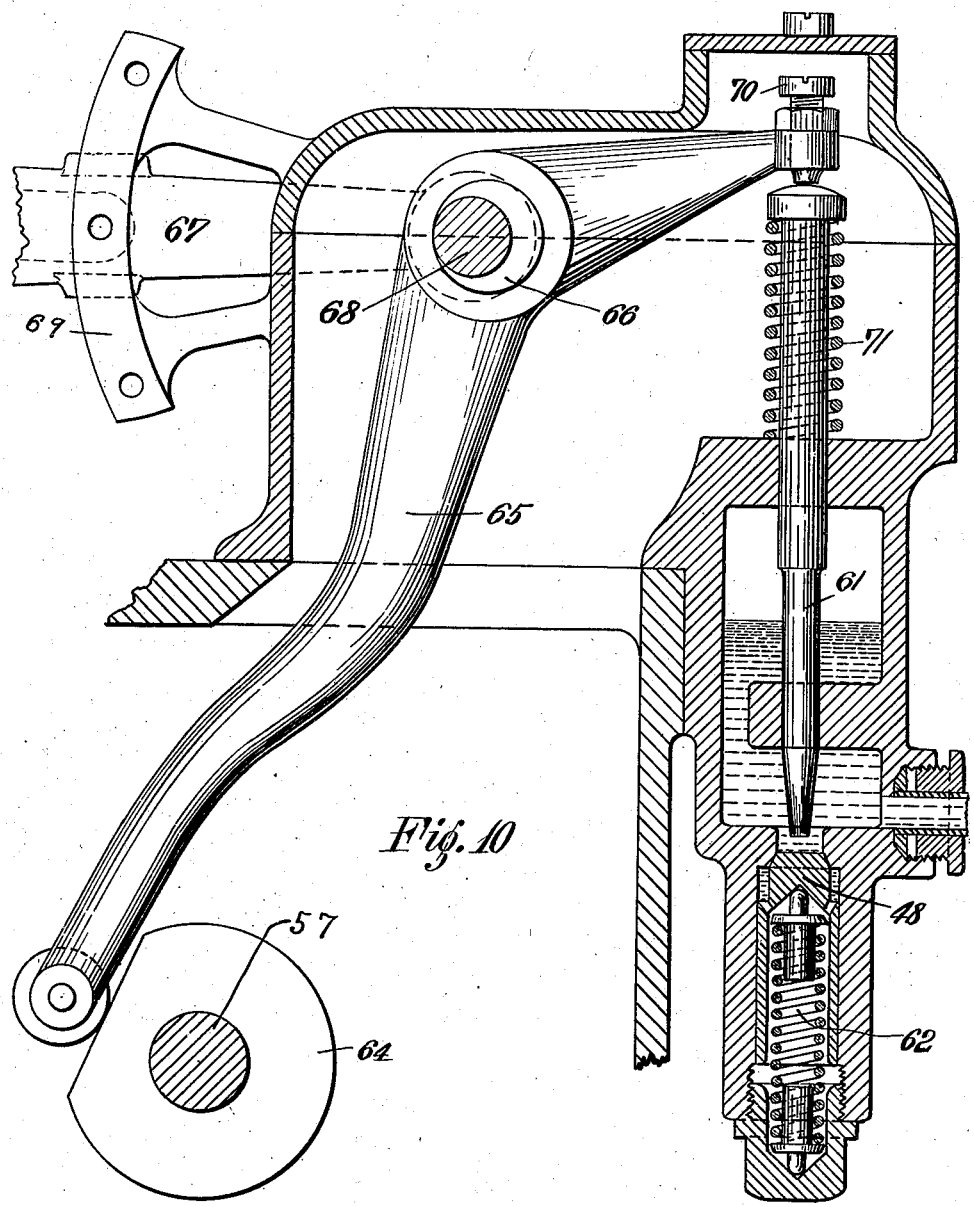

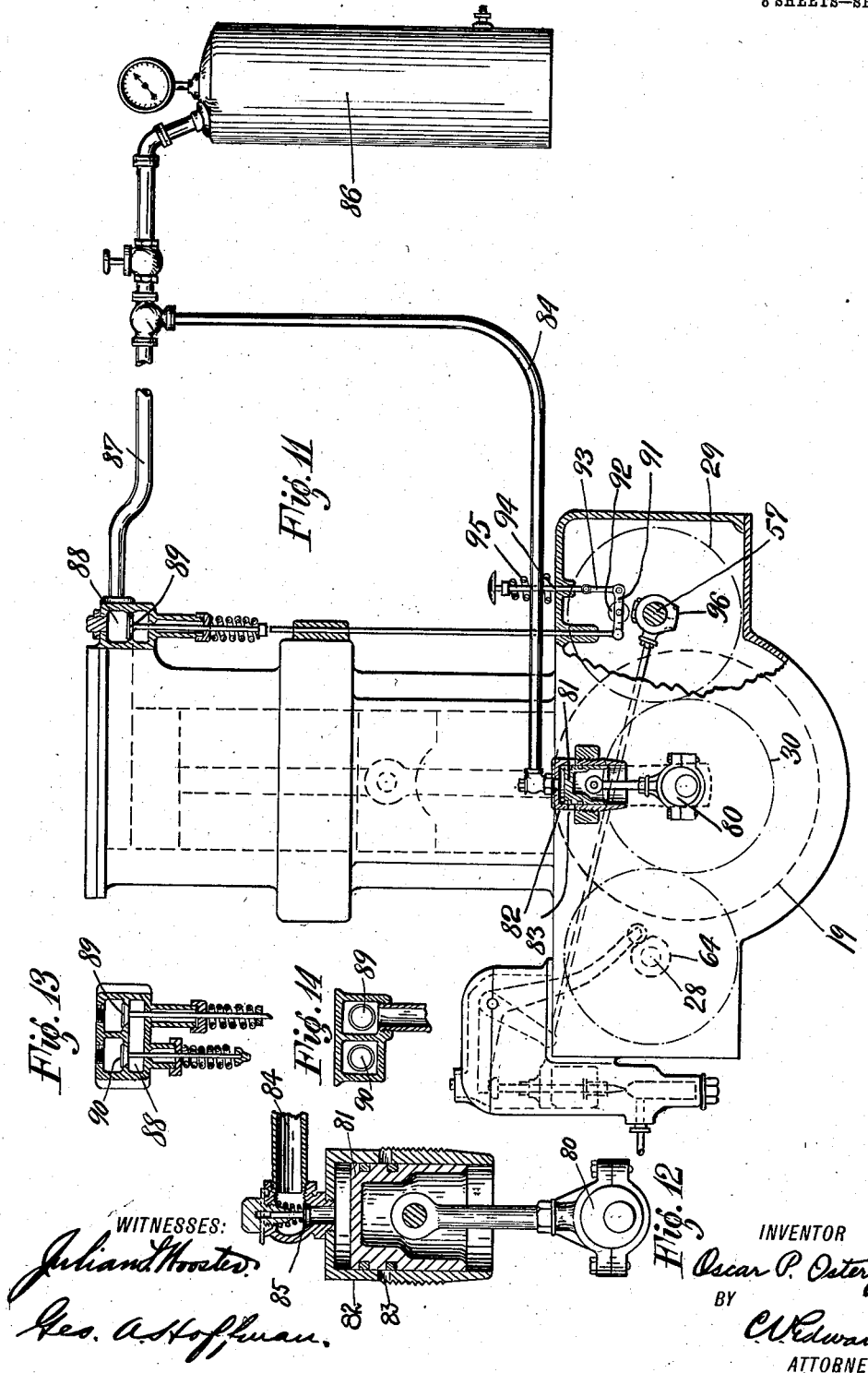

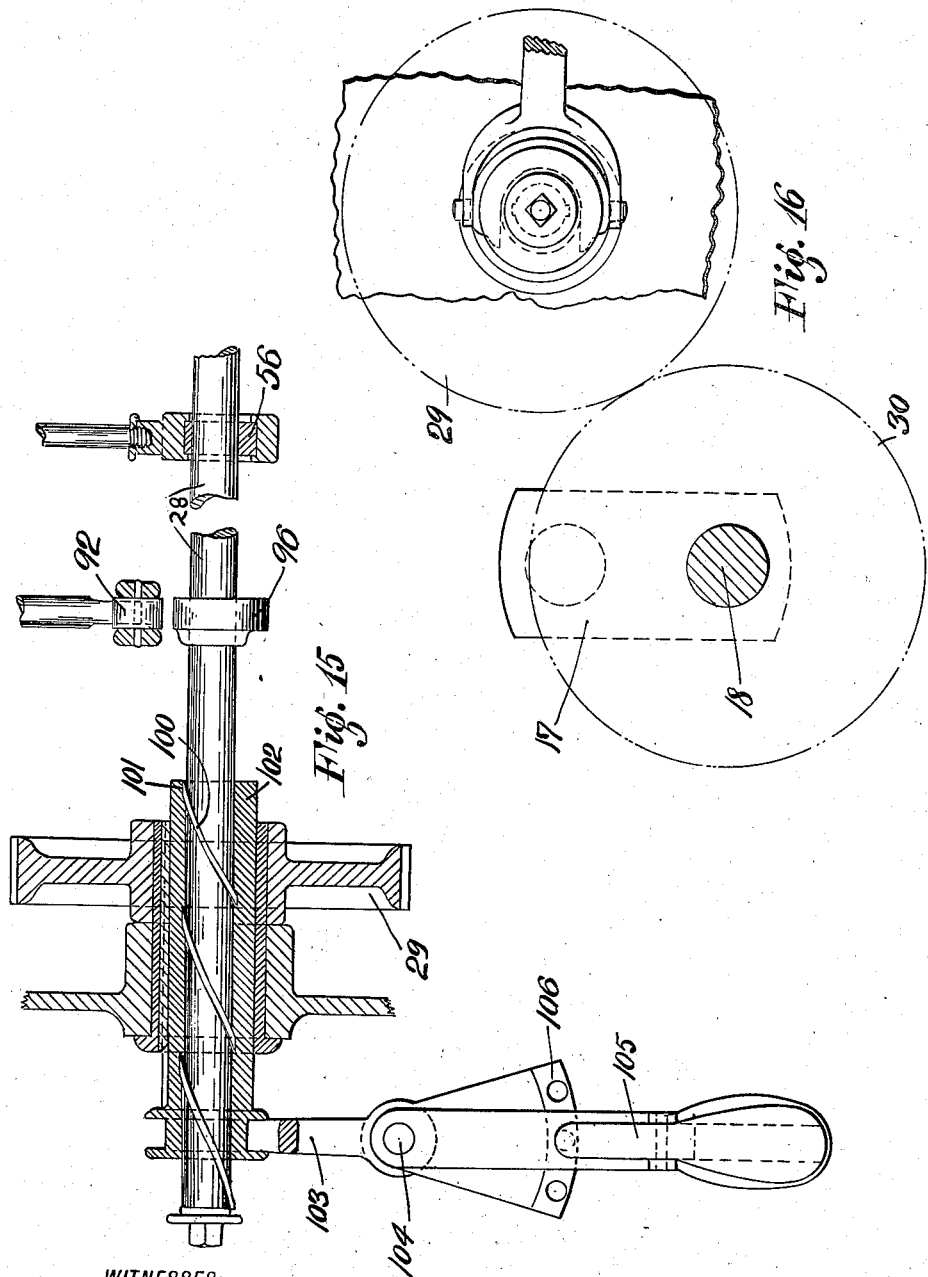

UNITED STATES PATENT OFFICE.

OSCAR P. OSTERGREN, OF NEW YORK, N. Y., ASSIGNOR, BY MESNE ASSIGNMENTS, TO WILLIAM M. POWER, OF EAST GREENWICH, RHODE ISLAND.

COMBUSTION-ENGINE.

No. 920,989.  Specification of Letters Patent.  Patented May 11, 1909.

Application filed October 15, 1904. Serial No. 228,501.

*To all whom it may concern:*

Be it known that I, OSCAR P. OSTERGREN, a subject of the King of Sweden, residing at No. 5 West One Hundred and Second street, New York city, in the county of New York and State of New York, have invented certain new and useful Improvements in Combustion-Engines, of which the following is a full, clear, and exact specification.

This invention relates to combustion engines, and has particular reference to improved means for operating and controlling such engines.

In combustion engines as at present known and more particularly in engines of the two cycle type, much difficulty is experienced in scavenging, and it has been found impossible to completely clear the cylinder of the burned gases. By this invention, I propose to accomplish this result by admitting a blast of air at one end of the cylinder and causing it to push the burned gases out through an exhaust port at the opposite end of the cylinder.

A further object of the invention is to provide improved means for feeding and controlling the admission of liquid fuel to the combustion chamber, whereby the fuel is injected in an atomized condition, mixed with air, and ignited, in a quantity which may be varied to any desired degree according to the power to be developed.

The invention is shown applied to a two cycle combustion engine which may be generally described as follows. Assuming the piston to have commenced to move outward in response to an impulse, the outer end of the cylinder is provided with ports communicating with a storage air chamber, having a valve opening inward. As the piston moves outward it compresses air in the storage chamber until it has moved far enough to uncover the ports and allow the compressed air to pass into the cylinder on the opposite side of the piston. Just before the piston uncovers the ports of the storage chamber, the exhaust port at the opposite end of the cylinder opens, the gases thereupon commence to exhaust, and are accelerated by the scavenging blast which sweeps over the piston head and forces the gases ahead of it out through the open exhaust port. Meanwhile the piston passes the outer dead center, commences its return stroke and closes the air chamber ports. The fresh air has thus swept entirely through the cylinder, the exhaust port not being closed until the piston on its return, has passed beyond the ports, thus removing any diffused gases which may remain after the air chamber ports are closed. Further movement of the piston after the exhaust port closes, compresses the residue of the air blast to whatever extent desired in the cylinder for the next fuel charge, and during this time the inlet of the air chamber opens to draw in a fresh supply for compression by the next outward movement of the piston. Before the piston reaches the inner dead center, the fuel is injected in the form of spray, and mixed with the compressed air in time to insure proper ignition for the next impulse. By compressing the scavenging blast in a separate chamber instead of in the crank case, a higher pressure is secured and more effective scavenging, and the forcing of the lubricant out of the crank case bearings is avoided.

The fuel feeding mechanism comprises a force pump which can be adjusted to feed any desired quantity of fuel, in connection with a needle valve and deflecting devices in the cylinder for converting the jet into a spray and mixing it with the air and also for diverting a proportion of the fuel into an ignition pocket. The pump comprises a plunger and an admission valve which determines, by its period of seating, the quantity of fuel which will be injected by the pump to the atomizing devices. Means are provided for controlling the seating of the admission valve, as desired, and thus the power developed in the cylinder. It has been found that when a jet of fluid is forced at a high velocity through a needle valve having a contracted nozzle, it issues in the form of spray, and in combination with such a needle valve, I employ moving and fixed deflecting devices, whereby the fuel, except the small quantity introduced into the ignition pocket, is completely atomized and mixed in the combustion chamber, before ignition.

The self starting mechanism comprises an air reservoir, compressor, and suitable valves for admitting air to the cylinder when it is desired to start the engine, together with means for disconnecting the air reservoir after the engine has been started. For enabling the engine to go in either direction, a mechanism adapted to properly shift the position of the pump controlling and exhaust valve mechanism, is provided.

The invention will be more particularly described with reference to the form thereof shown in the accompanying drawings, in which—

Figure 2:
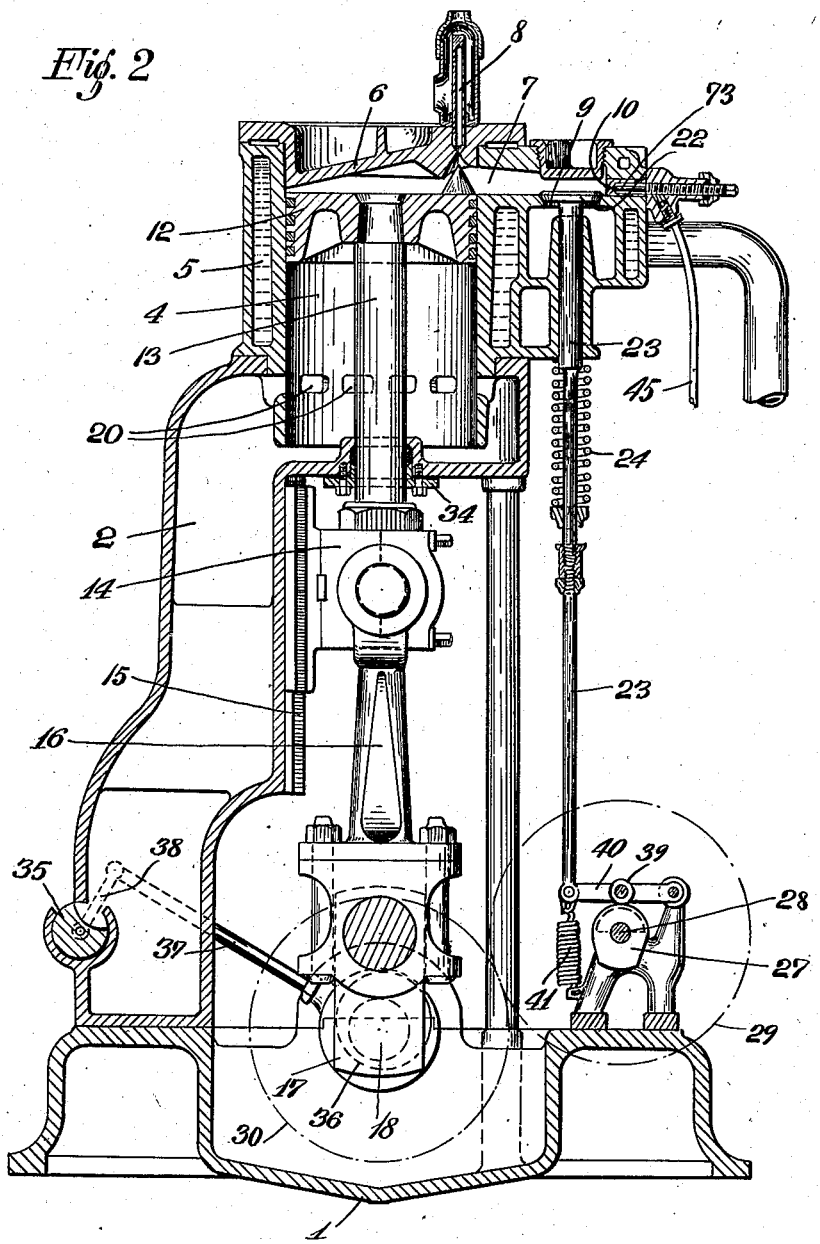

Figure 1 is a vertical section of my invention applied to a two cycle combustion engine. Fig. 2, is a similar view showing a slightly modified construction. Fig. 3, is a plan view, partly in section along the line 3—3 of Fig. 1. Fig. 4, is an inside view of the cylinder head, showing the deflecting vanes. Fig. 5, is a detail view of the conical deflector. Fig. 6 shows a section of the cylinder head shown in Fig. 4. Fig. 7 is a longitudinal section of a duplex feed pump for a two cylinder engine. Fig. 8, is a detail view of the pump plunger. Fig. 9, is a view of the eccentric which actuates the plunger. Fig. 10, is a view of the pump admission valve and the mechanism for controlling it. Fig. 11, is a general view of the engine and the starting mechanism. Fig. 12, is a detail view on an enlarged scale, of the air compressor. Figs. 13, and 14, are detail views. Fig. 15, is a view of the reversing mechanism, and Fig. 16 is a view showing the cam shaft geared to the crank shaft.

1 represents the base, 2 the storage air chamber for the scavenging blast, 4 the cylinder, 5 water jacket, 6 inner inwardly inclined cylinder head, 7 combustion chamber, 8 igniter, 9 exhaust port, 10 fuel admission port.

The piston 12 is mounted on a piston rod 13 which is connected to a crosshead 14, sliding between guides 15 and driving through connecting rod 16 and crank 17 the main shaft 18, on which a flywheel 19 is mounted.

Referring particularly to Fig. 1, 20 are ports in the cylinder leading to the storage air chamber 2, and 21 is a valve mounted on the piston rod which opens inwardly to admit air to the storage air chamber 2. The exhaust port 9 is controlled by a valve 22 mounted on a rod 23 and normally held closed by a spring 24. The rod 23 is operated to open the valve by a rod 25, having a roller 26 bearing on cam 27 which is mounted on shaft 28. The shaft 28 is revolved with the main shaft through gears 29 and 30.

31 is a spring bearing on the guide lug 32 and a coupling 33 for holding the roller 26 against the cam 27.

In Fig. 2, the piston rod slides through a stuffing box 34 and a valve 35 controls the admission of air to the storage air chamber. The valve 35 is actuated from the main shaft by an eccentric 36, rod 37 and lever 38 on the valve stem. The exhaust valve operating mechanism also differs from that shown in Fig. 1, in that the rod 23 is actuated directly by the cam 27 through a roller 39 on a link 40, a spring 41 being provided to hold the roller in engagement with the cam.

As soon as the piston commences its outward stroke, the valve 21, in Fig. 1 and valve 35 in Fig. 2, close. The air in front of the piston is thus compressed in the storage air chamber 2 and compression continues until the piston, on its outward stroke, uncovers the ports 20. Just before this the exhaust valve opens, the cam 27 having been properly timed for this purpose. The burned gases immediately commence to exhaust through the port 9, and, as soon as the piston uncovers ports 20, the scavenging blast compressed in storage air chamber 2 rushes over the piston into the cylinder and forces the burned gases ahead of it out through the exhaust port. In the meantime, the piston passes the outer dead center and commences its return stroke. After it has passed the ports 20, the valve 21 opens to permit a fresh supply of air to be drawn into the cylinder, or in Fig. 2, the eccentric 36 opens valve 35 for the same purpose. The exhaust port is not closed until the piston has passed a distance beyond the ports 20 sufficient to expel any diffused gases which may remain in the cylinder. As soon as the exhaust port is closed, compression of the residue of the scavenging blast commences, and is continued until the piston reaches the inner dead center.

Inasmuch as the fuel is admitted near the end of the return stroke, the compression may be made as high as desired without the danger of premature ignition which may occur when the mixture itself is compressed. A desired pressure for scavenging may be secured by properly proportioning the storage air chamber, whereas with the method of compressing the blast in the crank case, a desired pressure for scavenging was almost impossible to secure on account of the necessarily large volume of the crank case. The pressure in the crank case is also objectionable because it forces the lubricant out and causes the bearings to run dry. By making the storage air chamber independent of the crank case it is practicable to use a short piston and a crosshead instead of the long "trunk" piston heretofore used in engines of this type.

It will be seen that a much better effect is produced by a blast entering at one end of the cylinder and issuing at the other, than by a blast which is admitted and exhausted at the same end of the cylinder.

Referring to Figs. 7, 8, 9, 10, a duplex pump for a two cylinder engine is shown, in which there is a common reservoir, each side of the pump supplying one cylinder.

46 is a reservoir from which lead passages 47, 47, having the admission valves 48, 48. The passages 47 lead to pump chambers 49, 49 which latter are closed by valves 50, 50. A passage 51 leads from each pump chamber through pipe 45 to a needle valve chamber 52. Each pump comprises a plunger 53 which is operated through bell crank 54, rod 55 and eccentric 56 on shaft 28 with a motion which is synchronous with the piston. Packing 58, bushing 59 and spring 60 bearing on the bushing prevent any leakage. Should any leakage occur it will flow into the reservoir and cause no inconvenience.

61 is a rod which opens the admission valve 48 against the spring 62. 63 is a similar spring for the valve 50. The rod 61 is operated from a cam 64 on shaft 57 through a bell crank 65 pivoted on an eccentric 66 mounted on a shaft 68. The eccentric 66 is turned by a lever 67 to raise or lower the bell crank 65, and held in adjusted position by a latch. 70 is an adjustment screw. 71 is a spring for holding the rod in engagement with the screw 70.

The needle valve chamber 52 contains a needle valve 73 and has a constricted conical nozzle 74 which leads into the combustion chamber 7.

75 is an adjusting screw for the needle valve.

Mounted on the piston, so as to be in line with the spray from the nozzle 74, is a conical deflector 76 and mounted on the inside of the cylinder head 6 are deflecting vanes 77. Located in the cylinder head is a pocket 78 which leads into the igniter. In the embodiment illustrated the igniter is in the form of an ignition tube 79 which communicates with the pocket through an always open vent or passage. 68ª is a Bunsen burner or other suitable heater for heating the ignition tube 79.

The operation of the parts just described is as follows: assuming the piston to be commencing its outward stroke. At this time, the roller on bell crank 65 bears on the cut away portion of the cam 64, allowing spring 71 to hold the rod 61 out of engagement with the admission valve 48 which therefore remains closed. The plunger is on its downward stroke, and, because valve 48 is closed, forces the liquid fuel in chamber 49 through feed tube 45 into the needle valve chamber 52, and thence through the nozzle 74 into the combustion chamber. I have found that when a mass of fluid is suddenly forced through a needle valve having a constricted nozzle, it issues at a high velocity in the form of spray.

To secure thorough atomizing and mixing, I provide the movable conical deflector 76 and fixed deflectors 77. As the atomized jet issues from the nozzle at high velocity, it strikes the deflector in the manner illustrated in Fig. 3. On account of the movement of the deflector, which intercepts the spray of fuel, as shown in Fig. 1, the angle of incidence continually varies thus is produced a fan-like distribution of the jet. The vanes 77 further deflect the atomized particles and a complete mixing of the atomized charge with the fresh compressed air secured. The heat acquired by the cone and the vanes, after a few ignitions, will also aid in atomizing the fuel. Some of the particles deflected from the cone during the latter part of the inward stroke of the piston, when the cone enters the spray of fuel will be directed toward the pocket 78, which (when the type of igniter selected for illustration in the drawings is employed) forms a vent from the ignition tube and, because of the higher pressure in the combustion chamber at any instant than in the igniting tube these particles will be drawn into the ignition tube and ignited. When any other type of igniter is employed the fuel will be introduced into contact with it in the same manner. There is thus produced a means for introducing fuel into contact with the igniter. This means produces a sufficiently rich mixture to insure inflammation of the charge when running at low loads and with the period of fuel injection beginning later than at high loads. As the piston reaches the inner end of its stroke, the cone will be introduced into the pockets 78, as shown in Fig. 1, and will partly close such pocket. The fuel which has been introduced into the pocket will therefore be confined in contact with the pocket and in proximity to the igniter, and will be retained in such position a sufficient length of time to insure ignition. There is thereby produced a means whereby a portion of the fuel is maintained in contact with the igniter until ignited. The presence of the cone within the pocket in the position of the piston will to some extent close the opening of the pocket, and thereby will serve as a means for retarding the diffusion of such contents of the pocket into the other contents of the combustion chamber. The particles of fuel will be drawn into the ignition tube and ignited, or they will be ignited in a different manner if a different form of igniter is employed. The flame will flash out through the vent, and, impinging on the cone, will scatter, and ignite the mixture, thus driving the piston outward. When working under low loads, and when the actual quantity of fuel introduced is small, the quantity introduced into the ignition pocket 78 nevertheless will be substantially constant, and will produce a mixture that will invariably ignite. If the fuel in the combustion chamber is so much diffused that inflammation will not carry, such fuel will be spontaneously ignited by the raising of the temperature of the contents of the combustion chamber by the burning of the fuel in the pocket.

When the pump admission valve 48 is open the movement of the pump plunger merely forces oil back into the reservoir, instead of opening the valve 50 to eject oil through the nozzle 74. In order to produce the best effect, the admission valve must close very quickly, and during its period of seating (when the roller is on the cut away portion of the cam 64) the pump plunger should have its maximum speed. The cam is accordingly given a sharp drop which in connection with the springs 62 and 71 insures quick action of the admission valve 48. The pump plunger being actuated by an eccentric, has a more regular motion, with the maximum velocity at the middle portion of the stroke. In practice, I proportion the plunger so that it will feed the maximum amount of fuel during the middle third of its movement, provided the admission valve remains closed. By varying the time of seating the admission valve, the amount of fuel fed by the pump is correspondingly varied, but the velocity of the spray does not change. This insures proper mixture, irrespective of the quantity of fuel and permits the engine to be operated upon the combustion principle with variable cut off.

The period of the seating of the admission valve is varied by varying the extent of movement imparted to the rod 61. The cam 64 always gives the bell crank the same angular movement but by raising or lowering the fulcrum of the bell crank through the eccentric 66 the amount of idle travel given the rod 61 before it opens the admission valve 48 is varied, hence the time of seating of the valve is varied. With the eccentric in its lowest position, the valve remains seated during an instant of the stroke of the pump plunger, and the minimum amount of fuel is fed, but with the eccentric in its highest position the valve remains seated during the period necessary to feed the maximum amount of fuel, and by adjusting the eccentric within these limits the power to be developed can be varied as desired. The lever 67 and segment 69 enable this to be conveniently accomplished manually, and automatic regulation may be secured by connecting the lever 67 with a suitable governor. Since the pressure in the cylinder never falls below atmospheric pressure the feed pipe and needle valve are always full of fuel and the impulse of the pump is immediately effective in ejecting the fuel from the nozzle.

The mechanism for starting the engine from rest is operated by air compressed into a tank during the operation of the engine, but other means may be used. Mounted on the main shaft is an eccentric 80 which operates a piston 81 in a compressing cylinder 82. 83 are the air ports and the air is compressed by the movement of the piston after the ports are closed. From the cylinder 82 a pipe 84 having check valve 85 leads to a storage tank 86 and a pipe 87 leads from the tank to the chamber 88. The chamber 88 is closed by a valve 89 which is opened by the operator when it is desired to admit air to the main cylinder. 90 is a check valve preventing the escape of cylinder pressure. It is advisable that the air be only admitted to the cylinder when the crank is off the dead center and in position to drive the engine in the desired direction. To this end, the mechanism for operating the valve 89 is inoperative except when the crank is in the proper position. Pivoted to the stem of valve 89 is a link 91 carrying a roller 92. Link 91 is pivoted to a link 93 and the latter to a plunger 94 which has a spring 95 for returning the links to normal position after being operated. On the eccentric shaft 28 is a cam or fulcrum 96 which at certain portions of its revolution, passes under the roller 92. The cam is so set that, whenever the crank is stopped in proper position to be started by the compressed air, it will be at rest under the roller 92, and upon depressing the rod 94 the cam acts as a fulcrum for the link 91 and thus the valve 89 is opened. By opening valve 89 pressure is admitted to the chamber 88, lifting check valve 90 and thence flowing into the cylinder and starting the engine. It will be seen that if the cam 96 is not under the roller, the depression of the rod 94 merely moves the roller without moving the valve 89. The air compressor is proportioned so as to give the desired tank pressure, and after this has been reached, continued operation of the compressor merely compresses and expands the air in the cylinder without raising the tank pressure, the only loss being that due to heat radiation.

The reversing mechanism is mounted on the shaft 28, and operates to shift the pump eccentric and cam controlling the exhaust valve so as to reverse the engine. To this end, the shaft 28 carrying the gear 29 can be rotated independently of the gear, to change the position of the pump eccentric and exhaust valve cam relatively to the main piston. The shaft 57 has spiral splines 100 which engage with grooves 101 in a longitudinally movable sleeve 102 on which the gear 29 is keyed. The shaft is turned by moving the sleeve 102 longitudinally through a forked lever 103 pivoted at 104 and having a latch 105 engaging a segment 106 to hold it in position. On account of the engagement of the gear 29 with the main shaft through gear 30, the shaft 28 will turn rather than the gear and thus shift the eccentric and cam.

It will be understood that the invention herein described is capable of modification and changes without departing from its scope, and I do not restrict myself to the specific construction herein described.

Having thus described my invention, I declare that what I claim as new and desire to secure by Letters Patent, is,—

1. The combination with a fluid injecting pump, of a nozzle having a contracted orifice and a needle valve, whereby the fluid issues therefrom in the form of spray, deflecting devices in proximity to the nozzle for distributing the spray, and means for continuously varying the deflection of the spray, substantially as described.

2. The combination with a fluid injecting pump, of an atomizing nozzle, and a movable deflector which intercepts the path of the jet from the nozzle and adapted to further atomize and distribute the jet, substantially as described.

3. The combination with a fluid injecting pump, of an atomizing nozzle comprising a needle valve and a constricted passage, and a moving deflector which intercepts the path of the jet from the nozzle and adapted to deflect and further distribute the jet, substantially as described.

4. An internal combustion engine which has a combustion chamber, an igniter and means for introducing fuel from the combustion chamber into contact with the igniter, there being a moving means to retard the diffusion of such fuel into the combustion chamber.

5. An internal combustion engine which has a combustion chamber, an igniter, and means for introducing fuel from the combustion chamber into contact with the igniter, there being means other than the igniter to retard the diffusion of such fuel into the combustion chamber.

6. An internal combustion engine. which has a combustion chamber, an igniter, and means for introducing fuel from the combustion chamber into contact with the igniter, there being a moving means other than the igniter to retard the diffusion of such fuel into the combustion chamber.

7. An internal combustion engine having a pocket with an igniter in communication therewith, the said pocket communicating with the combustion chamber, and means for introducing fuel into the pocket, from the combustion chamber, there being a device other than the igniter for retarding the diffusion of the fuel from the pocket into the combustion chamber.

8. An internal combustion engine having a pocket, with an igniter in communication therewith, the said pocket communicating with the combustion chamber, and means for introducing liquid fuel into the pocket, from the combustion chamber, there being a device other than the igniter for retarding the diffusion of the fuel from the pocket into the combustion chamber.

9. An internal combustion engine having a pocket with an igniter in communication therewith, the said pocket communicating with the combustion chamber, and means for introducing fuel into the pocket, from the combustion chamber, there being a movable device for retarding the diffusion of the fuel from the pocket into the combustion chamber.

10. An internal combustion engine having a pocket with an igniter in communication therewith, the said pocket communicating with the combustion chamber and means for introducing liquid fuel into the pocket, from the combustion chamber, there being a movable device for retarding the diffusion of the fuel from the pocket into the combustion chamber.

11. In an internal combustion engine, the combination of a combustion chamber, a pocket, and means for introducing fuel in quantities varying with the load, into the combustion chamber and from the combustion chamber into the pocket, and a means other than the igniter for retaining a portion of said fuel in the pocket, and in contact with the igniter until ignited.

12. In an internal combustion engine, the combination of a combustion chamber, a pocket, and means for introducing fuel in quantities varying with the load, into the combustion chamber and from the combustion chamber into the pocket, and a means other than the igniter for retaining a portion of said fuel in the pocket, and in contact with the igniter until ignited, such means operating irrespective of the quantity of fuel introduced.

13. In an internal combustion engine, the combination of a combustion chamber, a pocket, and means for introducing fuel in quantities varying with the load, into the combustion chamber and from the combustion chamber into the pocket, and a means other than the igniter for retaining a portion of said fuel in the pocket, and in contact with the igniter until ignited, the quantity of air being constant irrespective of the quantity of fuel.

14. In an internal combustion engine, the combination of a combustion chamber, a pocket, and means for introducing fuel in quantities varying with the load, into the combustion chamber and from the combustion chamber into the pocket, and a means other than the igniter for retaining a portion of said fuel in the pocket, and in contact with the igniter until ignited, such means operating irrespective of the quantity of fuel injected, the quantity of air being constant irrespective of the quantity of fuel.

15. In an internal combustion engine, the combination of a combustion chamber, a pocket, and means for introducing fuel in quantities varying with the load, into the combustion chamber and from the combustion chamber into the pocket, and a moving means for retaining a portion of said fuel in the pocket, and in contact with the igniter until ignited.

16. In an internal combustion engine, the combination of a combustion chamber, a pocket, and means for introducing fuel in quantities varying with the load, into the combustion chamber and from the combustion chamber into the pocket, and a moving means for retaining a portion of said fuel in the pocket, and in contact with the igniter until ignited, such means operating irrespective of the quantity of fuel introduced.

17. In an internal combustion engine, the combination of a combustion chamber, a pocket, and means for introducing fuel in quantities varying with the load, into the combustion chamber and from the combustion chamber into the pocket, and a moving means for retaining a portion of said fuel in the pocket, and in contact with the igniter until ignited, the quantity of air being constant irrespective of the quantity of fuel.

18. In an internal combustion engine, the combination of a combustion chamber, a pocket, and means for introducing fuel in quantities varying with the load, into the combustion chamber and from the combustion chamber into the pocket, and a moving means for retaining a portion of said fuel in the pocket, and in contact with the igniter until ignited, such means operating irrespective of the quantity of fuel introduced, the quantity of air being constant irrespective of the quantity of fuel.

19. In an internal combustion engine, the combination of means for introducing a portion at least of the fuel during the compression stroke, a stationary igniter, and a piston, the working face of which is shaped to deflect a portion of such fuel into contact with the igniter.

20. In an internal combustion engine, the combination of means for introducing all of the fuel during the compression stroke, a stationary igniter, and a piston, the working face of which is shaped to deflect a portion of such fuel into contact with the igniter.

21. In an internal combustion engine, the combination of means for introducing a portion at least of the fuel during the compression stroke, a stationary igniter, and a device carried by the piston, and which brings a portion of said fuel into contact with the igniter.

22. In an internal combustion engine, the combination of means for introducing all of the fuel during the compression stroke, a stationary igniter, and a device carried by the piston, and which brings a portion of said fuel into contact with the igniter.

23. In an internal combustion engine, the combination of means for introducing a portion at least of the fuel during the compression stroke, a stationary igniter, and means within the working cylinder moving synchronously with the piston which brings the said fuel into contact with the igniter.

24. An internal combustion engine having a stationary igniter, and means for introducing fuel during a portion of the compression stroke, there being means which brings fuel into contact with the igniter during less than the total period of introduction.

25. An internal combustion engine having a moving means for diverting a spray of fuel into contact with the igniter.

26. An internal combustion engine having a single means for introducing the fuel from the combustion chamber into contact with the igniter and to retain such fuel in contact with the igniter until ignited.

27. An internal combustion engine having a single means for introducing the fuel from the combustion chamber into contact with the igniter and for retarding the diffusion of such fuel into the combustion chamber.

28. An internal combustion engine having a single means for introducing the fuel from the combustion chamber into contact with the igniter and for retaining such fuel in contact with the igniter until ignited, and for retarding the diffusion of such fuel into the combustion chamber.

29. An internal combustion engine having means for introducing a varying quantity of liquid fuel and means for diverting a substantially constant quantity into an ignition pocket.

30. An internal combustion engine having means for introducing substantially constant quantities of fuel into an ignition pocket and a variable quantity into the combustion chamber, with means for igniting the contents of the pocket, whereby the contents of the combustion chamber will be raised to such a temperature that its contents will spontaneously ignite.

31. An internal combustion engine, having a combustion chamber, means for introducing fuel directly therein, an ignition pocket, an igniter therein, and means for introducing an igniting charge into the ignition pocket.

In testimony whereof I affix my signature, in presence of two witnesses.

OSCAR P. OSTERGREN.

Witnesses:
ERNST LUNDGREN,
HERBERT M. LLOYD.